United States Patent [19]

Ely et al.

[11] 4,210,206

[45] Jul. 1, 1980

[54] HIGH TEMPERATURE WELL TREATING WITH CROSSLINKED GELLED SOLUTIONS

[75] Inventors: John W. Ely; John M. Tinsley, both of Duncan, Okla.

[73] Assignee: Halliburton Company, Duncan, Okla.

[21] Appl. No.: 950,495

[22] Filed: Oct. 11, 1978

Related U.S. Application Data

[63] Continuation-in-part of Ser. No. 840,347, Oct. 7, 1977, abandoned.

[51] Int. Cl.$^2$ .................. E21B 43/26; E21B 33/138
[52] U.S. Cl. .................................. 166/294; 166/283; 252/8.55 R; 252/316
[58] Field of Search .................. 252/8.55 R, 316; 166/294, 280, 308, 283

[56] References Cited

U.S. PATENT DOCUMENTS

| | | | |
|---|---|---|---|
| 3,615,794 | 10/1971 | Nimerick | 166/293 X |
| 3,727,688 | 4/1973 | Clampitt | 252/8.55 X |
| 3,795,276 | 3/1974 | Eilers et al. | 166/294 X |
| 3,888,312 | 6/1975 | Tiner et al. | 166/308 |
| 3,898,165 | 8/1975 | Ely et al. | 252/8.55 |
| 4,033,415 | 7/1977 | Holtmyer et al. | 252/8.55 X |
| 4,078,609 | 3/1978 | Pavlich | 166/308 X |

*Primary Examiner*—Herbert B. Guynn
*Attorney, Agent, or Firm*—Thomas R. Weaver; John H. Tregoning

[57] ABSTRACT

The present invention relates to methods and compositions for treating high temperature well formations whereby highly viscous crosslinked gels are formed in the formations.

10 Claims, No Drawings

HIGH TEMPERATURE WELL TREATING WITH CROSSLINKED GELLED SOLUTIONS

This application is a continuation in part of our prior co-pending application Ser. No. 840,347, filed Oct. 7, 1977, now abandoned. All essential material of said prior application is hereby incorporated by reference.

In the treatment of a subterranean well formation, it is often necessary to introduce one or more highly viscous fluids therein. For example, when a highly porous and permeable formation is encountered it is sometimes necessary to contact all or part of the formation with a highly viscous material which functions as a temporary blocking agent whereby the contacted portion is blocked and subsequently introduced treating fluids are diverted to desired areas of the formation or to other formations. Further, in creating and propping fractures in a formation, highly viscous fluids are often utilized which maintain propping agents such as sand in suspension. Commonly, a fracturing fluid is pumped into the formation at a rate sufficient to open a fracture. Continued pumping of a fluid carrying suspended propping agent results in the placement of the propping agent within the fracture.

In order to open a fracture in a well formation to a width sufficient to place the propping agent therein, the fracturing fluid should be highly viscous to avoid leak-off of the fluid from the fracture to the surrounding formation. In addition, a highly viscous fracturing fluid will support the propping agent particles suspended therein without excessive settling.

High viscosity complexed gels have been utilized in the treatment of well formations heretofore. However, such gels generally break, i.e., become less viscous, very rapidly when they encounter temperatures of about 140° F. or greater. This reduction in viscosity results in the rapid settling of propping agent suspended in the gels and can often produce undesirable fracturing results.

By the present invention methods and compositions for treating high temperature well formations, i.e., formations existing at temperatures in the range of from about 120° F. to about 350° F. are provided wherein a highly viscous crosslinked gel is formed in the formation. The resulting highly viscous gel is stable at high formation temperatures and is capable of suspending proppant for relatively long periods of time.

The method of the present invention for treating high temperature well formations comprises preparing a composition which forms a highly viscous crosslinked gel at formation temperatures in the range of from about 120° F. to about 350° F., and then introducing the composition into the well formation whereby it is heated and the gel formed.

The compositions of the present invention are aqueous solutions comprised of water; a gelling agent and a crosslinking agent which is activated at temperatures above about 120° F., namely, hexamethoxymethylmelamine. At temperatures of about 120° F. and above, the composition forms a highly viscous crosslinked gel which remains highly viscous for long periods of time at temperatures up to and including about 350° F.

Gelling agents useful herein are selected from the group consisting of water soluble hydratable polysaccharides having a molecular weight of at least about 100,000, preferably from about 200,000 to about 3,000,000 and derivatives thereof, water soluble synthetic polymers such as high molecular weight polyacrylamides, water soluble hydratable polysaccharides which have been crosslinked with a compound selected from the group consisting of dialdehydes having the general formula:

wherein n is an integer within the range of 0 to about 3; 2-hydroxyadipaldehyde; dimethylol urea, water soluble urea formaldehyde resins; water soluble melamine formaldehyde resins; and mixtures thereof.

The preferred crosslinking agents for forming the retarded gelling agent of this invention are dialdehydes having the general formula:

wherein n is an integer within the range of 1 to about 3.

Examples of dialdehydes within the above general formula are glyoxal, malonic dialdehyde, succinic dialdehyde and glutardialdehyde.

Examples of suitable hydratable polysaccharides are guar gum, locust bean gum, karaya gum, carboxymethylcellulose, hydroxyethylcellulose and carboxymethylhydroxyethylcellulose. A particularly suitable hydratable polysaccharide is hydroxyethylcellulose having an ethylene oxide substitution within the range of about 1 to about 10 moles of ethylene oxide per anhydroglucose unit. A preferred such compound is hydroxyethylcellulose having an ethylene oxide substitution of 1.5 moles of ethylene oxide per anhydroglucose unit. Another preferred hydratable polysaccharide which is retarded at temperatures below about 100° F. is hydroxyethylcellulose having an ethylene oxide substitution of about 1.5 moles per anhydroglucose unit crosslinked with about 0.8 parts by weight glyoxal per 100 parts by weight hydroxyethylcellulose.

Examples of high molecular weight water soluble polyacrylamides are anionic copolymers of acrylamide and sodium acrylate, anionic random copolymers of polyacrylamide and a water soluble polyethylenically unsaturated monomer, and cationic copolymers of acrylamide and a quaternary amine acrylate having molecular weights greater than about 500,000. Of these, a cationic mixture of copolymers of acrylamide and a quaternary amine acrylate having an average molecular weight of about 1,000,000 is preferred.

In preparing the compositions of the present invention, one or more of the above described gelling agents are added to water in an amount in the range of from about 0.1 to about 13 parts by weight gelling agent per 100 parts by weight of the water used. The temperature activated hexamethoxymethylmelamine crosslinking agent is preferably combined with the aqueous gelling agent solution in an amount in the range of from about 0.05 to about 5 parts by weight crosslinking agent per 100 parts by weight of water used. When the resulting composition reaches a temperature of about 120° F., the hexamethoxymethylmelamine reacts with the gelling agent to form a crosslinked highly viscous semisolid gel.

The crosslinking reaction takes place at a high rate when the aqueous composition is maintained at a pH in the range of from about 2 to about 6. A pH of about 4 to about 5 is preferred. In order to insure that the desired pH is retained for a period of time sufficient to permit the composition to be introduced into a well formation, a buffer can be incorporated into the composition. Examples of suitable such buffers are potassium biphthalate, sodium biphthalate, sodium hydrogen fumarate, and sodium dihydrogen citrate. Of these, sodium biphthalate is preferred and is preferably combined with the composition in an amount in the range of from about 0.05 to about 2 parts by weight buffer per 100 parts by weight of water utilized.

A particularly suitable composition of the present invention for use as a treating fluid in high temperature well formations is comprised of water; a cationic mixture of copolymers of acrylamide and a quaternary amine acrylate having an average molecular weight of about 1,000,000 present in an amount in the range of from about 0.05 to about 3 parts by weight per 100 parts by weight of water used; hydroxyethylcellulose having an ethylene oxide substitution of 1.5 moles per anhydroglucose unit present in an amount in the range of from about 0.05 to about 5 parts by weight per 100 parts by weight of water; hydroxyethylcellulose having an ethylene oxide substitution of about 1.5 moles per anhydroglucose unit crosslinked with about 0.8 parts by weight glyoxal per 100 parts by weight hydroxyethylcellulose present in an amount in the range of from about 0.05 to about 5 parts by weight per 100 parts by weight of water; hexamethoxymethylmelamine present in an amount in the range of from about 0.05 to about 4 parts by weight per 100 parts by weight of water; and sodium biphthalate present in an amount in the range of from about 0.05 to about 0.5 parts by weight per 100 parts by weight of water. While this composition has some viscosity after being prepared at ambient temperatures ordinarily encountered at the surface, the glyoxal crosslinked hydroxyethylcellulose component is not appreciably hydrated until reaching a temperature of about 100° F. Further, as stated above, the crosslinking agent, hexamethoxymethylmelamine, does not begin to crosslink the hydrated gels until reaching a temperature of at least about 120° F.

The compositions of the present invention are particularly suitable for use in treating high temperature well formations because they can be formed in situ. That is, in accordance with the method of the present invention, a treating composition is introduced into the formation, which upon being heated by the formation forms a highly viscous crosslinked gel complex therein.

As will be understood by those skilled in the art, a variety of internal breakers can be used with the compositions of the present invention for causing the highly viscous crosslinked gel formed to revert to a fluid having a low viscosity. For example, a quantity of an internal breaker such as an oxidizing agent or an enzyme capable of hydrolyzing glucositic links can be added to the composition at the time it is prepared. Examples of suitable enzymes are alpha and beta amylases, amyloglucosidase, oligoglucosidase, invertase, multase, cellulase, and hemicellulase. Examples of suitable oxidizing agents are ammonium persulfate, potassium dichromate and potassium permanganate.

In utilizing the compositions of the present invention for treating high temperature subterranean well formations, the composition is prepared at the surface by first mixing the gelling agent or agents, internal breaker and other components with the water. The crosslinking agent, hexamethoxymethylmelamine is preferably combined with the aqueous solution last, and the resulting gel forming composition is introduced into the formation to be treated. Upon reaching the formation, the composition is heated by the formation whereby the desired highly viscous crosslinked semisolid gel is formed.

The highly viscous crosslinked gel can be formed in a formation or a portion of a formation so that it functions to temporarily block fluids subsequently injected into the formation and diverts such fluids to desired treatment areas therein or to other formations. The compositions of the present invention are particularly suitable for creating and propping fractures in high temperature subterranean formations. In this application, the composition utilized is prepared at the surface and a propping agent is added thereto. Any of a variety of conventional propping agents can be employed, such as quartz, sand grains, tempered glass beads, rounded walnut shell fragments, aluminum pellets or other similar materials. Such propping agents are generally used in concentrations between about 1 to about 8 pounds per gallon of the treating compositions, but higher or lower concentrations may be used as required. The size of propping agent employed depends on the size of the fracture and the type of formation treated as well as other factors, but generally particles up to about 2 mesh on the U.S. Sieve Series Scale can be employed with the compositions of the present invention without screen-out occurring.

In carrying out the method of the present invention for propping a fracture in a high temperature well formation, after the treating composition having propping agent suspended therein is prepared, it is introduced, such as by pumping into the formation and into one or more fractures therein so that the composition is heated, the gelling agents contained in the composition are hydrated and the resulting hydrated gel crosslinked. The highly viscous semisolid gel formed in the fracture or fractures maintains the propping agent in uniform suspension and as a result, when the fracture or fractures are caused to close on the propping agent they are uniformly held open. The crosslinked gel is next caused to break or revert to a less viscous fluid so that it is removed from the formation without disturbing the propping agent distributed within the fracture or fractures.

In order to present a clear understanding of the present invention, the following example is given:

EXAMPLE

Autoclave tests of various compositions of this invention are carried out in the laboratory. The gelling agents indicated in Table I except for the glyoxal crosslinked hydroxyethylcellulose are batch mixed with tap water, hexamethyloxymethylmelamine and sodium biphthalate in the quantities shown, and allowed to hydrate at room temperature for one hour. When used, the glyoxal crosslinked hydroxyethylcellulose is added to the mixtures last, and the resulting compositions are placed in autoclave cells. Nylon pellets are placed on top of each composition prior to sealing the cells, pressurizing the cells to 850 psig and placing the cells in an autoclave. The compositions are heated at a temperature of 300° F. under a pressure of 850 psig for 2 hours after which they are removed from the autoclave and quickly cooled and observed. The results of such observations are shown in Table I below.

TABLE I

FORMATION OF CROSSLINKED GELS AT 300° F. AND 850 PSIG

Gelling Agents and Quantities Used, Pounds per 1000 Gallons of Water

| Hydroxy-ethyl-cellulose[1] | Copolymers of Acrylamide and Quaternary Amine Acrylate Having an Ave. Molecular Weight of 1,000,000 | Glyoxal Crosslinked Hydroxy-ethyl-cellulose[2] | Quantity of Sodium Biphthalate, Pounds per 1000 Gallons of Water | Quantity of Sodium Hexamethoxy-methyl-melamine, Gallons per 1000 Gallons of Water | Remarks and Observations |
|---|---|---|---|---|---|
| 0 | 80 | 90 | 10 | 10 | Highly viscous crosslinked gel formed-pellets held at top of gel |
| 0 | 80 | 70 | 10 | 10 | Highly viscous crosslinked gel formed-pellets held at top of gel |
| 0 | 80 | 40 | 10 | 10 | Highly viscous crosslinked gel formed-pellets held at top of gel |
| 20 | 60 | 40 | 10 | 10 | Highly viscous crosslinked gel formed-pellets held at top of gel |
| 0 | 100 | 60 | 10 | 10 | Highly viscous crosslinked gel formed-pellets held at top of gel |
| 20 | 60 | 60 | 10 | 10 | Highly viscous crosslinked gel formed-pellets held at top of gel |
| 20 | 60 | 30 | 10 | 10 | Highly viscous crosslinked gel formed-pellets held at top of gel |
| 20 | 60 | 0 | 10 | 10 | Highly viscous crosslinked gel formed-pellets held at top of gel |
| 20 | 80 | 60 | 10 | 10 | Highly viscous crosslinked gel formed-pellets held at top of gel |

[1]Hydroxyethylcellulose having an ethylene oxide substitution of 1.5 moles per anhydroglucose unit
[2]Hydroxyethylcellulose having an ethylene oxide substitution of 1.5 moles per anhydroglucose unit crosslinked with 0.8 parts glyoxal per 100 parts hydroxyethylcellulose It will be apparent from the foregoing that many widely different embodiments of this invention can be made without departing from the spirit and scope thereof, and therefore it is not intended to be limited except as indicated in the appended claims.

What is claimed is:

1. A method of treating a well formation existing at a temperature in the range of from about 120° F. to about 350° F. with a temporary blocking agent comprising the steps of:

preparing a temporary blocking agent composition which forms a highly viscous crosslinked gel at the temperature of said well formation, said composition being comprised of water, a gelling agent present in the range of from about 0.1 to about 13 parts by weight per 100 parts by weight of said water and selected from the group consisting of water soluble polysaccharides having a molecular weight of at least about 100,000, said water soluble polysaccharides crosslinked with a compound selected from the group consisting of dialdehydes having the general formula:

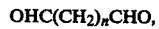

wherein n is an integer within the range of 0 to about 3, 2-hydroxyadipaldehyde, dimethylol urea, water soluble urea formaldehyde resins, water soluble melamine formaldehyde resins, and mixtures thereof, water soluble polyacrylamides and mixtures thereof, and hexamethoxymethylmelamine present in the range of from about 0.05 to about 5 parts by weight per 100 parts by weight of said water; and introducing said composition into said well formation whereby said composition is heated to a temperature in the range of from about 120° F. to about 350° F. and formed into a highly viscous crosslinked gel in said formation.

2. The method of claim 1 wherein said gelling agent is a mixture of compounds consisting of a cationic mixture of copolymers of acrylamide and a quaternary amine acrylate having an average molecular weight of about 1,000,000 present in said composition in an amount in the range of from about 0.05 to about 3 parts by weight per 100 parts by weight of water, hydroxyethylcellulose having an ethylene oxide substitution of 1.5 moles per anhydroglucose unit present in said composition in an amount in the range of from about 0.05 to about 5 parts by weight per 100 parts by weight of water, and hydroxyethylcellulose having an ethylene oxide substitution of about 1.5 moles per anhydroglucose unit crosslinked with about 0.8 parts by weight glyoxal per 100 parts by weight hydroxyethylcellulose present in said composition in an amount in the range of from about 0.05 to about 5 parts by weight per 100 parts by weight of water, and said hexamethoxymethylmelamine is present in said composition in an amount in the range of about 0.05 to about 4 parts by weight per 100 parts by weight of water.

3. The method of claim 2 wherein said composition is further characterized to include a buffering agent to maintain said composition at a pH of about 4 to about 5 for a period of time sufficient to permit said composition to be introduced into said formation.

4. The method of claim 3 wherein said buffering agent is sodium biphthalate.

5. A method of using a temporary blocking agent to treat a well formation having a temperature in the range of from about 120° F. to about 350° F. which comprises:
preparing a temporary blocking agent composition comprised of water; a gelling agent consisting of a mixture of copolymers of acrylamide and a quaternary amine acrylate having an average molecular weight of about 1,000,000, present in an amount in the range of from about 0.05 to about 3 parts by weight per 100 parts by weight of water, hydroxyethylcellulose having an ethylene oxide substitution of 1.5 moles per anhydroglucose unit present in an amount in the range of from about 0.05 to about 5 parts by weight per 100 parts by weight of water, and hydroxyethylcellulose having an ethylene oxide substitution of about 1.5 moles per anhydroglucose unit crosslinked with about 0.8 parts by weight glyoxal per 100 parts by weight hydroxyethylcellulose present in an amount in the range of from about 0.05 to about 5 parts by weight per 100 parts by weight of water; hexamethoxymethylmelamine present in an amount in the range of from about 0.05 to about 4 parts by weight per 100 parts by weight of water; and sodium biphthalate present in said solution in an amount of from about 0.05 to about 0.5 parts by weight per 100 parts by weight of water; and
introducing said composition into said well formation whereby said composition is heated and a highly viscous crosslinked gel is formed in said formation.

6. A method of propping a fracture in a well formation having a temperature in the range of from about 120° F. to about 350° F. comprising the steps of:
preparing a fracturing fluid having a propping agent suspended therein which forms a highly viscous crosslinked gel at the temperature of said well formation, said fracturing fluid being comprised of water, a gelling agent present in the range of from about 0.1 to about 13 parts by weight per 100 parts by weight of said water and selected from the group consisting of water soluble polysaccharides having a molecular weight of at least about 100,000, said water soluble polysaccharides crosslinked with a dialdehyde having the general formula:

OHC(CH$_2$)$_n$CHO, wherein
n is an integer within the range of 0 to about 3, water soluble polyacrylamides and mixtures thereof, and hexamethoxymethylmelamine in an amount of from about 0.05 to about 5 parts by weight per 100 parts by weight of water;
pumping said fracturing fluid and propping agent into said formation and into said fracture whereby said fracturing fluid is heated by contact with said formation and a highly viscous crosslinked gel is formed therefrom;
allowing said highly viscous crosslinked gel to revert to a thin fluid; and
removing said thin fluid from said formation.

7. The method of claim 6 wherein said gelling agent is a mixture of compounds consisting of copolymers of acrylamide and a quaternary amine acrylate having an average molecular weight of about 1,000,000, present in said composition in an amount in the range of from about 0.05 to about 3 parts by weight per 100 parts by weight of water, hydroxyethylcellulose having an ethylene oxide substitution of 1.5 moles per anhydroglucose unit present in said composition in an amount in the range of from about 0.05 to about 5 parts by weight per 100 parts by weight of water, and hydroxyethylcellulose having an ethylene oxide substitution of about 1.5 moles per anhydroglucose unit crosslinked with about 0.8 parts by weight glyoxal per 100 parts by weight hydroxyethylcellulose present in said composition in an amount in the range of from about 0.05 to about 5 parts by weight per 100 parts by weight of water, and said hexamethoxymethylmelamine is present in said composition in an amount in the range of about 0.05 to about 4 parts by weight per 100 parts by weight of water.

8. The method of claim 7 wherein said fracturing fluid is further characterized to include sodium biphthalate present in said fracturing fluid in an amount in the range of from about 0.05 to about 0.5 parts by weight per 100 parts by weight of water.

9. A method of propping a fracture in a well formation at a temperature in the range of from about 120° F. to about 350° F. which comprises:
preparing a fracturing fluid having a propping agent suspended therein comprised of water, a mixture of compounds consisting of copolymers of acrylamide and a quaternary amine acrylate having an average molecular weight of about 1,000,000, present in an amount in the range of from about 0.05 to about 3 parts by weight per 100 parts by weight of water, hydroxyethylcellulose having an ethylene oxide substitution of 1.5 moles per anhydroglucose unit present in an amount in the range of from about 0.05 to about 5 parts by weight per 100 parts by weight of water, hydroxyethylcellulose having an ethylene oxide substitution of about 1.5 moles per anhydroglucose unit crosslinked with about 0.8 parts by weight glyoxal per 100 parts by weight hydroxyethylcellulose present in an amount in the range of from about 0.05 to about 5 parts by weight per 100 parts by weight of water, hexamethoxymethylmelamine present in an amount in the range of from about 0.05 to about 4 parts by weight per 100 parts by weight of water, and sodium biphthalate present in an amount of from about 0.05 to about 0.5 parts by weight per 100 parts by weight of water;
pumping the fracturing fluid and propping agent into said formation and into said fracture whereby said fracturing fluid is heated by contact with said formation and a highly viscous crosslinked gel is formed therefrom;
allowing the highly viscous crosslinked gel to revert to a thin fluid; and
removing the thin fluid from the formation.

10. A high temperature well formation treating composition which forms a highly viscous crosslinked gel and remains stable at temperatures in the range of from about 120° F. to about 350° F. which comprises;
(a) water;
(b) a mixture of copolymers of acrylamide and a quaternary amine acrylate having an average molecular weight of about 1,000,000 present in the range of from about 0.05 to 3 parts by weight per 100 parts by weight of said water
(c) hydroxyethylcellulose having an ethylene oxide substitution of 1.5 moles per anhydroglucose unit present in an amount in the range of from about 0.05 to about 5 parts by weight per 100 parts by weight of water;
(d) hydroxyethylcellulose having an ethylene oxide substitution of about 1.5 moles per anhydroglucose unit crosslinked with about 0.8 parts by weight glyoxal per 100 parts by weight hydroxyethylcellulose present in an amount in the range of from about 0.05 to about 5 parts by weight per 100 parts by weight of water;
(e) hexamethoxymethylmelamine present in an amount in the range of from about 0.05 to about 4 parts by weight per 100 parts by weight of water; and
(f) sodium biphthalate present in said solution in an amount of from about 0.05 to about 0.05 parts by weight per 100 parts by weight of water.

* * * * *

UNITED STATES PATENT AND TRADEMARK OFFICE
CERTIFICATE OF CORRECTION

PATENT NO. : 4,210,206
DATED : July 1, 1980
INVENTOR(S) : JOHN W. ELY and JOHN M. TINSLEY It is certified that error appears in the above-identified patent and that said Letters Patent are hereby corrected as shown below:

In Claim 10, at line 13 of Column 10, the number "0.05" (second occurrence) should be deleted and --0.5-- inserted therefor.

Signed and Sealed this

Twenty-third Day of September 1980

[SEAL]

Attest:

SIDNEY A. DIAMOND

Attesting Officer

Commissioner of Patents and Trademarks